United States Patent
Miyamoto

(10) Patent No.: US 11,188,321 B2
(45) Date of Patent: Nov. 30, 2021

(54) PROCESSING DEVICE AND SOFTWARE EXECUTION CONTROL METHOD

(71) Applicant: Toshiba Memory Corporation, Tokyo (JP)

(72) Inventor: Hisaya Miyamoto, Yokohama Kanagawa (JP)

(73) Assignee: TOSHIBA MEMORY CORPORATION, Tokyo (JP)

(*) Notice: Subject to any disclaimer, the term of this patent is extended or adjusted under 35 U.S.C. 154(b) by 0 days.

(21) Appl. No.: 16/453,962

(22) Filed: Jun. 26, 2019

(65) Prior Publication Data

US 2020/0081708 A1 Mar. 12, 2020

(30) Foreign Application Priority Data

Sep. 6, 2018 (JP) .............................. JP2018-166978

(51) Int. Cl.
| | | |
|---|---|---|
| *G06F 9/44* | (2018.01) | |
| *G06F 8/71* | (2018.01) | |
| *G06F 9/54* | (2006.01) | |
| *G06F 9/30* | (2018.01) | |
| *H04L 9/32* | (2006.01) | |
| *G06F 9/38* | (2018.01) | |

(52) U.S. Cl.
CPC .............. *G06F 8/71* (2013.01); *G06F 9/3005* (2013.01); *G06F 9/3877* (2013.01); *G06F 9/542* (2013.01); *H04L 9/3247* (2013.01)

(58) Field of Classification Search
CPC ...... G06F 8/61; G06F 16/2365; G06F 21/105; G06F 2221/0766; G06F 8/71; G06F 9/3005; G06F 9/3877; G06F 9/542; H04L 9/3247
USPC .................................................. 717/100–120
See application file for complete search history.

(56) References Cited

U.S. PATENT DOCUMENTS

| | | | |
|---|---|---|---|
| 6,564,326 B2 | 5/2003 | Helbig, Sr. | |
| 9,135,463 B2 | 9/2015 | Yasaki et al. | |
| 9,256,731 B2 | 2/2016 | Sasao et al. | |
| 2014/0075567 A1* | 3/2014 | Raleigh .............. | G06Q 30/0601 726/26 |
| 2017/0371660 A1* | 12/2017 | Smith ................... | G06F 9/3005 |

FOREIGN PATENT DOCUMENTS

| | | |
|---|---|---|
| JP | 5482059 B2 | 4/2014 |
| JP | 2014235326 A | 12/2014 |

\* cited by examiner

*Primary Examiner* — Chuck O Kendall
(74) *Attorney, Agent, or Firm* — Kim & Stewart LLP

(57) ABSTRACT

A processing device includes a memory, a first processor configured to execute software fetched from the memory, a second processor configured to perform a verification of the software stored in the memory, and a controller configured to control a fetch of the software from the memory by the first processor according to the verification performed by the second processor. The controller prohibits the fetch by the first processor until the verification of the software performed by the second processor is successful and permits the fetch by the first processor when the verification of the software performed by the second processor is successful.

20 Claims, 11 Drawing Sheets

PROCESSING DEVICE AND SOFTWARE EXECUTION CONTROL METHOD

CROSS-REFERENCE TO RELATED APPLICATION

This application is based upon and claims the benefit of priority from Japanese Patent Application No. 2018-166978, filed Sep. 6, 2018, the entire contents of which are incorporated herein by reference.

FIELD

Embodiments described herein relate generally to a processing device and a software execution control method.

BACKGROUND

A multiprocessor system includes a plurality of processors. The plurality of processors may include a security central processing unit (CPU) and may further include a plurality of other general CPUs. For example, the security CPU verifies firmware executed by the plurality of general CPUs. The plurality of general CPUs execute the verified firmware.

DETAILED DESCRIPTION

Figure 1:
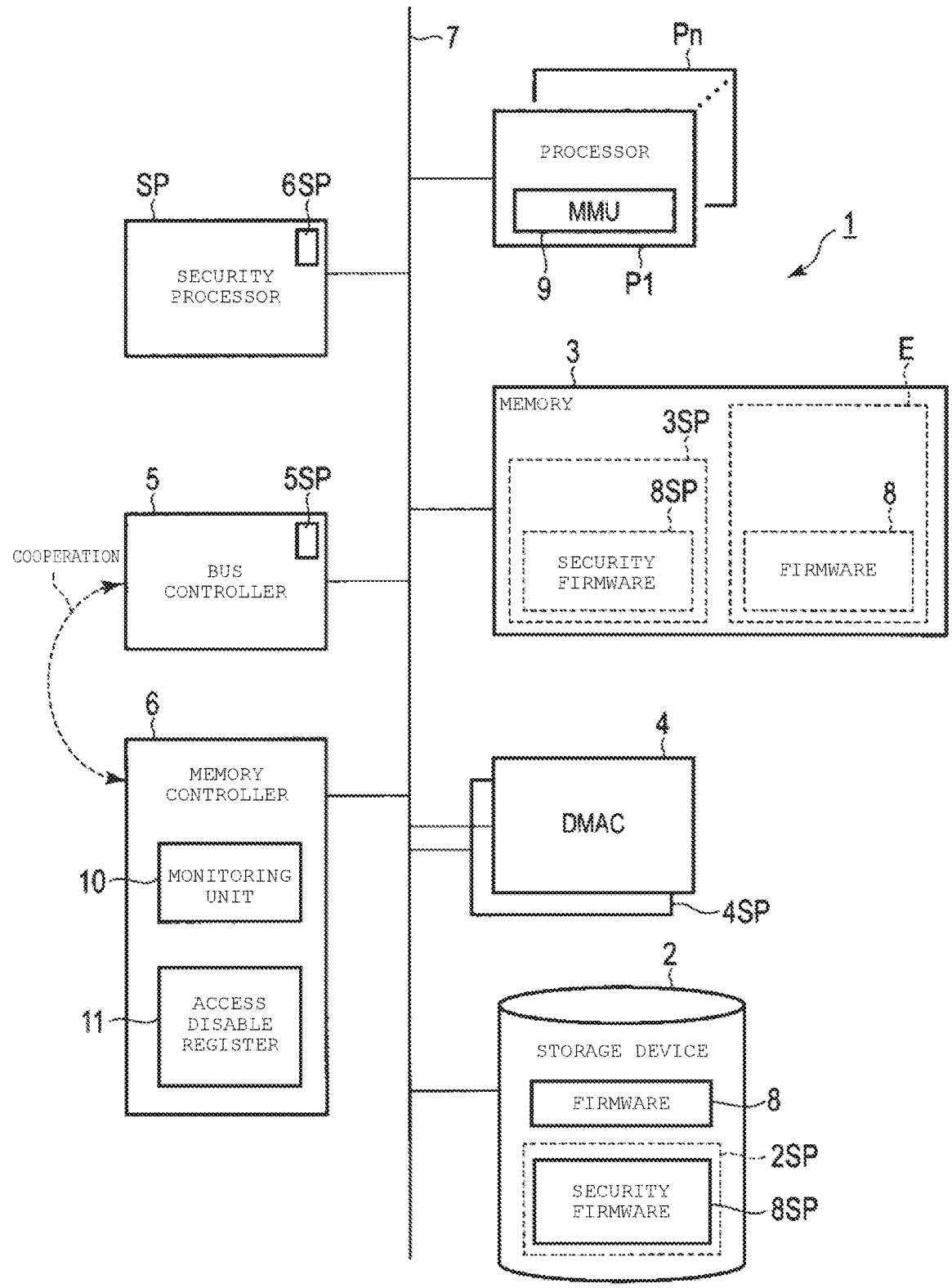
FIG. 1 is a block diagram illustrating an example of a configuration of a processing device according to a first embodiment.

Embodiments provide a processing device and a software execution control method which prevent unauthorized and potentially malicious software from being executed.

In general, according to one embodiment, there is provided a processing device including a memory, a first processor configured to execute software fetched from the memory, a second processor configured to perform a verification of the software stored in the memory, and a controller configured to control a fetch of the software from the memory by the first processor according to the verification performed by the second processor. The controller prohibits the fetch by the first processor until the verification of the software performed by the second processor is successful and permits the fetch by the first processor when the verification of the software performed by the second processor is successful.

Hereinafter, the present embodiments will be described with reference to drawings. It is noted that in the following description, the same reference numerals are given to components having the same or approximately the same function, and the description will be repeated only when necessary. The present embodiment is an example of a device and a method for specifying a technical idea, and the technical idea of the present embodiment does not limit the material, shape, structure, arrangement, and the like of components to the following. The technical idea of the present embodiment may be modified within the scope of the claims.

The present embodiment relates to a processing device for ensuring integrity of software.

In the present embodiment, a case where software to be verified is firmware is described as an example, but the software to be verified may be, for example, an operating system (OS), application software, or the like, and so the type of the software is not limited to any one type.

In the present embodiment, the software may include, for example, instruction codes, data, or a combination of the instruction codes and the data. In the present embodiment, the data included in the software is, for example, read-only data.

The processing device may be an embedded device or system including a processor such as a microcomputer, for example. The processing device may be a multiprocessor system or a memory system. The processing device may be connected to a network. By communicably connecting the processing device and a host computer via the network, it is possible to provide an advanced service from the host computer to the processing device.

In addition to the firmware for implementing a specific function, the processing device may store data as confidential, in some cases. Confidential data includes, for example, personal information and property information of a user who uses the processing device, information assets of the user or a group, and the like. The processing device needs to prevent a malicious third party from abusing the processing device for another purpose different from the original purpose. The processing device including a high-performance processor is useful for providing the advanced service, but when the processing device is abused, it may be a threat to the user, a service provider, a device manufacturer, and society in general. In this regard, the processing device including the processor is required to have a defense mechanism against an attack from the malicious third party.

In order to detect that the malicious third party tampers with the firmware, a secure boot for verifying a digital signature, which is assigned to the firmware in advance, at the time of starting up the processing device is used. By using the secure boot, for example, the processing device can verify the firmware loaded at the time of starting up the processing device and can execute only the reliable firmware that is digitally signed in advance.

In order to maintain robustness of the processing device, it is preferable to use another means in addition to the secure boot. For example, while the processing device operates, it is necessary to prevent the firmware during execution in each of the processors from being tampered with. When using only the secure boot, it may be difficult to detect that the firmware, running on the processor, is being tampered with. A method of tampering with the firmware running on the processor includes, for example, a buffer overflow attack attempted via the network.

A memory management unit (MMU) or a memory protection unit (MPU) is used as a mechanism that controls access to a memory space by a processor. The MMU or the MPU is a mechanism that controls the access to the memory by the processor on which the MMU or the MPU is implemented. Therefore, the MMU or the MPU does not control an operation of another processor which is not a processor including the MMU or the MPU.

For example, when firmware of a specific processor is loaded into a memory such as a random access memory (RAM), even if the processor malfunctions, the MMU or the MPU sets write protection so that instruction codes and read-only data of the firmware disposed in the memory are not destroyed.

As described above, the MMU or the MPU does not control a master device different from the processor including the MMU or the MPU. Here, for example, the master device is a device for accessing the memory area in which the firmware is disposed. In the present embodiment, each of the master devices is distinguished by each of unique master device IDs.

It is assumed that the MMU of a specific processor which executes specific firmware protects an area of a RAM, in which the specific firmware is disposed, by a write protect setting. In this case, the write protection for the area of the RAM is effective only for the specific processor and does not affect other master devices. Therefore, even if the specific processor sets the write protect to the area on the RAM to be protected, there is a possibility that the area on the RAM to be protected is written by another master device, which is not the specific processor.

In this regard, in the processing device according to the present embodiment, not only the specific processor but also other master devices cannot change the firmware stored in the area of the RAM to be protected. Further, in the processing device according to the present embodiment, it is possible to release the write protection state as necessary.

In the present embodiment, it is assumed that the change of the firmware includes changes to all pieces of the firmware, changes to some pieces of the firmware, rewriting, replacing, updating, version upgrading, and the like.

In the processing device, in some cases, in order to effectively utilize a small amount of a memory resource, a virtual memory is introduced and the instruction codes or the data of the firmware stored in a certain physical address is changed as necessary. A replacing operation in the virtual memory is performed by the processor itself which replaces the firmware, or by the master device such as a direct memory access controller (DMAC) operated by the processor.

In order to ensure integrity of the firmware changed after starting up the processing device, it is necessary to detect whether the change is authorized or not and to prevent unauthorized firmware from being fetched by the processor.

In the present embodiment, in order to ensure the integrity of the firmware, a security processor determines whether to permit a processor to fetch or prohibit a processor from fetching the firmware, and a monitoring unit performs the control for permitting or prohibiting the fetch of the firmware according to a determination result.

In the first embodiment to be described below, the security processor verifies the firmware loaded at the time of starting up the processing device and the monitoring unit controls memory access by the processor which executes the firmware, according to a verification result. The access by the processor which executes the firmware to the memory includes, for example, a write into the memory and the fetch of the firmware stored in the memory by the processor which executes the firmware. In the first embodiment, the security processor verifies the firmware executed by the security processor by using read-only instruction codes. For example, this verification may be done using digital certification.

In the second embodiment, the security processor verifies a changed part of the firmware at the time the firmware change is being executed and the monitoring unit controls memory access by a processor which executes the changed part, according to a verification result. In the second embodiment, the changed part of the firmware may be verified using digital certification.

First Embodiment

The present embodiment ensures integrity of the firmware loaded at the time of starting up the processing device. In the present embodiment, security firmware executed by a security processor is verified by the security processor, and then, firmware executed by another processor which is not the security processor is verified by the security processor.

FIG. 1 is a block diagram illustrating an example of a configuration of a processing device 1 according to the present embodiment.

The processing device 1 includes a storage device 2, a memory 3, direct memory access controllers (DMACs) 4 and 4SP, processors P1 to Pn, a security processor SP, a bus controller 5, a memory controller 6, and a bus 7.

The storage device 2, the memory 3, the DMACs 4 and 4SP, the processors P1 to Pn, the security processor SP, the bus controller 5, and the memory controller 6 are connected so as to transmit and receive data to and from each other via the bus 7.

In the present embodiment, the DMACs 4 and 4SP, the bus controller 5, and the memory controller 6 may be implemented as electronic circuits, for example. Further, the DMACs 4 and 4SP, the bus controller 5, and the memory controller 6 may be implemented by, for example, a controller or a processor executing a program.

In the present embodiment, resources used by the security processor SP at the time of starting up the processing device 1 include, for example, an area 2SP exclusive for the security processor SP in the storage device 2, an area 3SP exclusive for the security processor SP in the memory 3, the DMAC 4SP exclusive for the security processor SP, an interface 5SP exclusive for the security processor SP in the bus controller 5, and an interface 6SP exclusive for the security processor SP in the memory controller 6.

It is assumed that the area 2SP exclusive for the security processor SP in the storage device 2, the area 3SP exclusive for the security processor SP in the memory 3, the interface 5SP exclusive for the security processor SP in the bus controller 5, and the interface 6SP exclusive for the security processor SP in the memory controller 6 are used only by the security processor SP and the DMAC 4SP exclusive for the security processor SP and is not used by other components.

At the time of starting up the processing device 1, the security processor SP loads security firmware 8SP from the area 2SP exclusive for the security processor SP in the storage device 2 to the area 3SP exclusive for the security processor SP in the memory 3 by using the exclusive DMAC 4SP.

When the security processor SP verifies the security firmware 8SP and the verification passes, the security processor SP fetches the security firmware 8SP from the exclusive area 3SP in the memory 3 and executes the security firmware 8SP. In the present embodiment, a program to start up the security processor SP and verify the security firmware is stored in a read-only memory (ROM) and is not rewritable.

By starting up the security processor SP in the procedure described above, it is possible to prevent the security processor SP from executing an unauthorized process.

The storage device 2, which is a nonvolatile memory such as a hard disk drive or a solid state drive (SSD) for example, stores firmware 8. In the present embodiment, the firmware 8 executed in the processing device 1 is an example. In the processing device 1, not only the firmware 8 but also various firmware may be executed. Two or more processors may execute the same firmware or may respectively execute different firmware.

The memory 3 is, for example, a random access memory (RAM). The firmware 8 is loaded into the memory 3 at the time of starting up the processing device 1 and the memory 3 temporarily stores the firmware 8 to be fetched by the processors P1 to Pn. For example, the memory 3 may be accessed faster than the storage device 2 and is used as a main storage area by the processors P1 to Pn.

In the present embodiment, the write process means writing from the processors P1 to Pn to the memory 3 and writing to the memory 3 by the processors P1 to Pn using the DMAC 4. The write process includes, for example, caching from the processors P1 to Pn to the memory 3 and the like.

In the present embodiment, data transfer means that the DMACs 4 and 4SP transfer some pieces or all pieces of the firmware 8 and 8SP from a transfer source device such as the storage device 2 or the like to the memory 3, for example. In some cases, the data transfer is referred to as loading, for example. It is noted that the data transfer may also be defined as a write process by a component other than the processors P1 to Pn. In other words, the data transfer may be defined as one type of the write process.

The DMAC 4 performs the data transfer directly between a source and a destination without the processors P1 to Pn. It is noted that a plurality of DMACs 4 are provided and a DMAC used for the data transfer among the plurality of DMACs may be specified by a DMAC ID.

The processors P1 to Pn are, for example, central processing units (CPUs). Each of the processors P1 to Pn includes a memory management unit (MMU) 9. In the present embodiment, the processing device 1 includes a plurality of processors P1 to Pn. The number of processors provided in the processing device 1 may be equal to or larger than one.

Hereinafter, the same operation performed by each of the processors P1 to Pn will be described by using the processor P1. The following description does not mean that the plurality of processors P1 to Pn operate as if they were one processor, but means that the description is applicable to each of the plurality of processors P1 to Pn.

The MMU 9 controls memory access by the processor P1. For example, the MMU 9 converts a virtual address into a physical address, protects the memory, controls caching, and the like.

In the present embodiment, a case where the MMU 9 is used in the processor P1 will be described as an example, but a memory protection unit (MPU) may be used instead of the MMU 9. For example, the MPU protects the memory in the same manner as the MMU 9, but the MPU may not include a function such as address conversion.

The processor P1 independently sets and manages execution authority of the firmware 8, for example, with the MMU 9 in the processor P1.

As described above, for example, the security processor SP executes the security firmware 8SP to perform control such as a verification of integrity of the firmware 8 to be fetched by the processor P1 and a notification based on the verification result.

In the present embodiment, the processor P1 and the security processor SP cannot change a setting of the MMU 9 provided in the other processors P2 to Pn and may not be able to directly control the firmware execution authority for the MMU 9 of the other processors P2 to Pn.

The security processor SP indirectly controls the execution authority of the firmware 8 executed by the processor P1 by using a monitoring unit 10 in the memory controller 6. For example, the monitoring unit 10 may be implemented as a part of the memory controller 6 or may be implemented as a controller dedicated for monitoring.

The security processor SP verifies the firmware 8 loaded from the storage device 2 to the memory 3, which is to be fetched by the processor P1, at the time of starting up the processing device 1 before it is fetched. As a result, it is possible to ensure integrity for the firmware 8 disposed in a memory area E of the memory 3.

The bus controller 5 manages the data transfer from a source to a destination via the bus 7. More specifically, the bus controller 5 determines whether to permit access from an access source to an access destination, for example, based on an ID of the access source.

The memory controller 6 manages whether or not to permit access to the storage device 2 and the memory 3. In the present embodiment, the memory controller 6 operates in cooperation with the bus controller 5. The memory controller 6 includes, for example, the monitoring unit 10 and an access disable register 11. It is noted that at least one of the monitoring unit 10 and the access disable register 11 may be provided outside of the memory controller 6. The monitoring unit 10 and the access disable register 11 may be used not only by the memory controller 6 but also by the bus controller 5.

The monitoring unit 10 monitors a plurality of memory areas of the memory 3 based on a request from the security processor SP and controls the fetch of the firmware 8 by the processor P1. For example, the monitoring unit 10 sets a fetch process on the firmware 8 in the memory area E in a wait state until the firmware 8, which is stored in the memory area E that is defined by the security processor SP to be a verification target, is verified. The monitoring unit 10 may be implemented as, for example, an electronic circuit. Further, a function of the monitoring unit 10 may be realized by a controller or a processor executing a program.

The access disable register 11 stores information specifying whether or not the fetch of the firmware 8 of the memory area E in the memory 3 is permitted. Only the security processor SP may set the information in the access disable register 11. The monitoring unit 10 may read the information set in the access disable register 11.

In the present embodiment, the processor P1, the security processor SP, and the monitoring unit 10 in the processing device 1 operate in cooperation as follows, for example.

At the time of starting up the processing device 1, the processor P1 requests permission from the security processor SP to fetch the firmware 8 loaded in the memory area E.

Next, the security processor SP verifies the firmware 8 stored in the memory area E. When it is determined that the verification passes, area information specifying the memory area E and fetch information 11e for specifying fetch permission illustrated in FIG. 2 (which is to be described below) are notified to the monitoring unit 10 via the access disable register 11.

The monitoring unit 10 performs control (for example, delay or prohibition) of the fetch from the memory area E by waiting until the area information and the fetch information 11e for specifying the fetch permission have been received from the security processor SP via the access disable register 11. In addition, when receiving the fetch information 11e specifying the fetch permission from the security processor SP via the access disable register 11, the monitoring unit 10 performs control to permit the fetch from the memory area E. Here, while the fetch from the memory area E is permitted, the monitoring unit 10 performs control so that the write process or data transfer on or into the memory area E is in a wait state.

When receiving a notification indicating that the fetch from the memory area E is permitted, from the security processor SP, the processor P1 starts to fetch the firmware 8.

The processing device 1 according to the present embodiment will be further described in detail.

Each of the processors P1 to Pn of the processing device 1 shares the memory 3.

The security processor SP is a processor used exclusively for security. The security processor SP verifies integrity and authenticity of the firmware 8 at the time of loading the firmware 8.

By using the MMU 9, the processor P1 controls execution authority of the firmware 8 by an operating system (OS) running on the processor P1 or an exclusive memory management routine. As described above, in the present embodiment, the security processor SP may not control setting of contents of the MMU 9 of the processor P1.

The security processor SP determines firmware execution authority for a loading process of the firmware 8 at the time of starting up the processing device 1.

Further, the monitoring unit 10 controls the fetch of the firmware 8, disposed in the memory area E of the memory 3, by the processor P1 according to the determination by the security processor SP.

More specifically, the security processor SP detects that the firmware 8 is being loaded into the memory area E at the time of starting up the processing device 1. The security processor SP determines whether the detected loading is authorized or not. The security processor SP detects the loading by a master device which is not authorized, prevents the loading without the authorization, verifies integrity of the loaded firmware 8, and sets fetch prohibition of the firmware 8 to be verified until the verification of the firmware 8 is completed.

The verification by the security processor SP is executed on the firmware 8 loaded from the storage device 2 to the memory 3 at the time of starting up the processing device 1 and is completed before the firmware 8 is executed by the specific processor P1. As a result, at the time of starting up the processing device 1, it is possible to execute only the firmware 8 determined to be authorized by the security processor SP and to ensure that the processing device 1 is safely started up.

The monitoring unit 10 is an exclusive circuit provided in the memory controller 6 and cooperates with the bus controller 5 to control the fetch by the processor P1 based on contents of information set by the security processor SP.

The access disable register 11 of the memory controller 6 is a storage circuit settable only by the security processor SP.

When the security processor SP determines that the firmware 8 is authentic, the processor P1 may fetch the instruction codes or the data from the memory area E of the memory 3 via the memory controller 6. The memory controller 6 includes the access disable register 11 which is read-only for each of the processors P1 to Pn so that all of the processors P1 to Pn may read the status (for example, fetch information 11e to be described below) specifying whether or not the fetch by each of the processors P1 to Pn is permitted.

Figure 2:
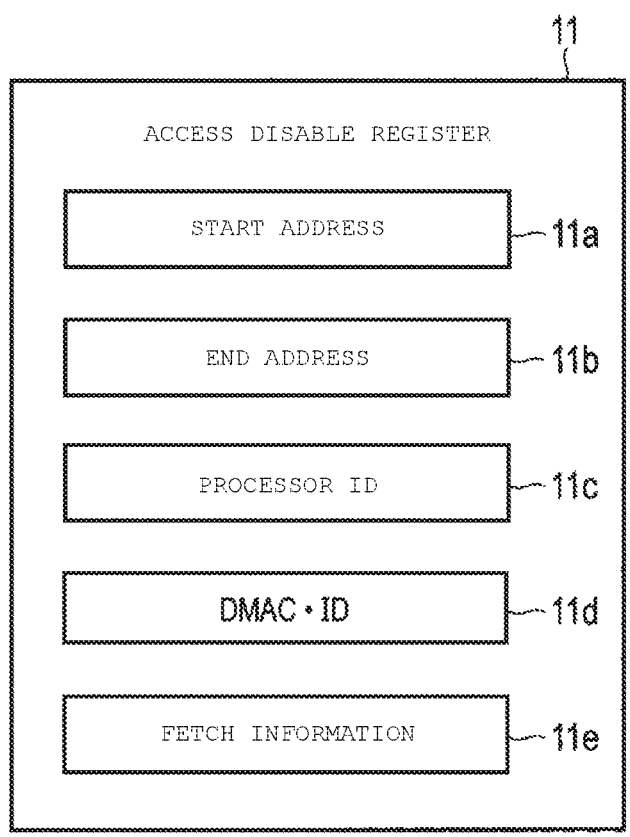
FIG. 2 is a block diagram illustrating an example of a configuration of an access disable register that is set by a security processor.

FIG. 2 is a block diagram illustrating an example of a configuration of the access disable register 11 that is in the memory controller 6 and set by the security processor SP.

FIG. 2 illustrates only information used for monitoring the memory area E to be verified in the memory 3. Information in the same manner as FIG. 2 is set for each of memory areas to be verified in the memory 3.

The access disable register 11 stores a start address 11a and an end address 11b which represent one example of area information specifying the memory area E, a processor ID 11c that specifies the processor P1 which performs the fetch from the memory area E, a DMAC ID 11d that specifies the DMAC 4 which transfers data to the memory area E, and the fetch information 11e specifying whether or not the fetch from the memory area E by the processor P1 is permitted. The fetch information 11e specifies fetch prohibition as a default and when the security processor SP permits the fetch, the fetch information 11e specifies fetch permission.

The monitoring unit 10 of the memory controller 6 cooperates with the bus controller 5 to monitor the write process or the data transfer on or into the memory area E by a master device, by using a master device ID. The master device is, for example, the processor P1 or the DMAC 4. The master device ID is, for example, the processor ID 11c or the DMAC ID 11d. When the master device specified by the master device ID requests the write process or the data transfer for the memory area E, the monitoring unit 10 accesses the access disable register 11. When the fetch information 11e specifies fetch prohibition, the monitoring unit 10 determines that the write process or the data transfer is permitted and performs control to permit the write process or the data transfer. On the other hand, when the fetch information 11e specifies fetch permission, the monitoring unit 10 determines that the write process or the data transfer is prohibited and performs control to prohibit the write process or the data transfer. If the number of processors P1 to Pn implemented in the processing device 1 is n, the number of the memory areas managed by the access disable register 11 (N) is larger than n.

When detecting the fetch prohibition by the access disable register 11, the monitoring unit 10 appropriately delays a request of the fetch that is currently prohibited.

When the fetch for the memory area E is permitted, the monitoring unit 10 performs control to prohibit the write process or data transfer on or into the memory area E. As a result, it is possible to prevent the firmware 8 from being tampered with during execution.

When receiving a transfer completion notification from the DMAC 4 indicated by the DMAC ID 11d illustrated in FIG. 2, the monitoring unit 10 determines that the loading of the firmware 8 from the storage device 2 to the memory 3 is completed and notifies the processor P1 of a determination result.

When the loading of the firmware 8 from the storage device 2 to the memory 3 is completed, the processor P1 may transition to a state in which it is waiting for the fetch until the security processor SP permits the fetch of the firmware 8, for example. The state of waiting for the fetch may be expressed as dormant or sleep. Alternatively, the processor P1 may delay the fetch of the firmware 8 by polling the access disable register 11 until the fetch of the firmware 8 is permitted.

The security processor SP verifies whether or not the firmware 8 loaded in the memory 3 is authentic. The verification will be described with a specific example. The firmware 8 loaded in the memory 3 includes a firmware main body including instruction codes, data, and first authentication information. The security processor SP stores a public key. The security processor SP generates second authentication information based on the loaded firmware main body and the public key. The security processor SP determines whether or not the firmware 8 is authentic based on whether or not the first authentication information and the second authentication information match with each other.

The security processor SP notifies the processor P1 of fetch permission of the verified firmware 8 by setting the fetch information lie in the access disable register 11. For example, the security processor SP sets the area information and the fetch information 11e specifying the fetch permission in the access disable register 11. When the fetch information 11e specifies fetch permission, the monitoring unit 10 generates an interrupt for the processor P1 in the wait state indicated by the processor ID 11c corresponding to the fetch information lie. In this way, the monitoring unit 10 releases the wait state of the processor P1 by generating the interrupt for the processor P1.

In the present embodiment described above, the security processor SP sets the area information specifying the memory area E, in which the firmware 8 is disposed, of the memory 3 and the processor ID 11c that specifies the processor P1 capable of fetching the firmware 8 in the memory area E, in the access disable register 11 for the memory controller 6 cooperating with the bus controller 5.

When the processor P1 requests a fetch to a memory area of the memory 3 and the fetch by the processor P1 is not permitted, the monitoring unit 10 of the memory controller 6 sets the request for the fetch to be in a wait state.

Only the security processor SP may set the area information specifying the memory area E to be monitored for a fetch for the memory controller 6 and the processor ID 11c for specifying the processor P1.

In this way, because only the security processor SP may set the area information specifying the memory area E and the processor ID 11c for specifying the processor P1 which is permitted the fetch of the firmware 8 from the memory area E, it is possible to improve integrity of the firmware 8 being fetched by the processor P1.

In the present embodiment, the security processor SP verifies the firmware 8 loaded at the time of starting up the processing device 1. When the verification passes, the security processor SP permits the processor P1 to fetch the firmware 8. As a result, it is possible to secure integrity of the loaded firmware 8.

In the present embodiment, after starting up the processing device 1, and during the fetch, the monitoring unit 10 prohibits the write process or the data transfer for the memory area E in which the firmware 8 is stored. For this reason, it is possible to prevent the firmware 8 from being tampered with during the fetch and subsequent execution of the firmware 8.

In the present embodiment, the security processor SP loads the non-rewritable security firmware 8SP from the exclusive area 2SP to the exclusive area 3SP by using the exclusive DMAC 4SP, fetches the security firmware 8SP, and executes the security firmware 8SP. As a result, it is possible to ensure safety of the process executed by the security processor SP.

In the present embodiment, it is possible to prevent the processing device 1 from being used for other purposes than the original purpose to improve the defense against an attack from a malicious person.

In the present embodiment, it is possible to ensure integrity of the firmware 8 at a higher level without changing design of the processors P1 to Pn, so that the present embodiment is easy to be introduced.

Second Embodiment

A second embodiment relates to ensuring integrity at a stage of partially changing the firmware 8 and is to be distinguished from ensuring the integrity at a start-up stage of the processing device 1 described in the first embodiment. It is noted that the firmware 8 may be partially changed at the same time by the plurality of processors P1 to Pn in the processing device 1. Not only in cases where some pieces of the firmware 8 are changed, but even in cases where all pieces of the firmware 8 are changed, the same control as in the present embodiment may be applied. Some changes of the firmware 8 include, for example, updating, rewriting, loading, replacing, and the like of some pieces of the software.

Figure 3:
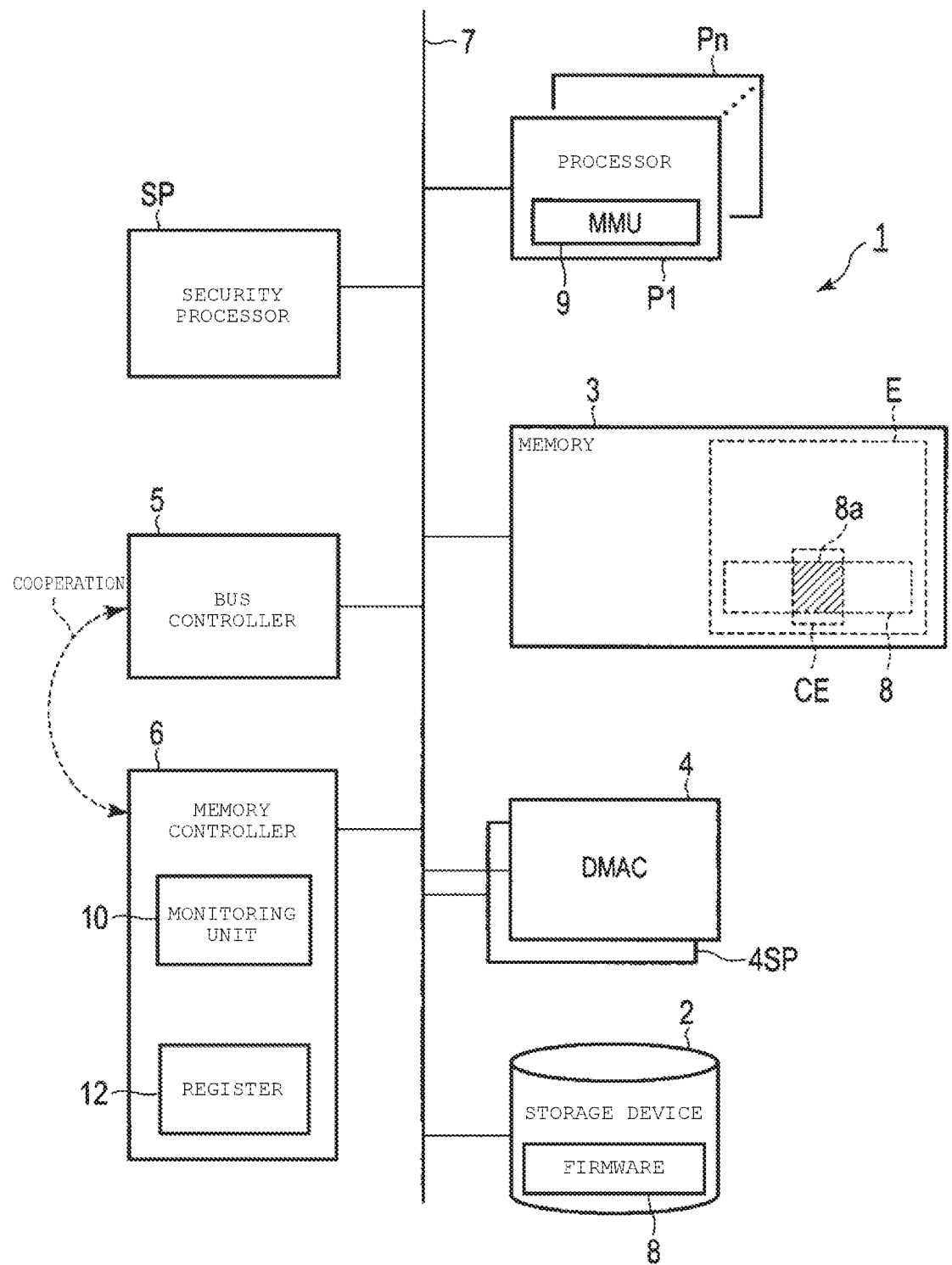
FIG. 3 is a block diagram illustrating an example of a configuration of a processing device according to a second embodiment.

FIG. 3 is a block diagram illustrating an example of a configuration of the processing device 1 according to the present embodiment.

In the present embodiment, some pieces of the firmware 8 disposed in the memory 3 are changed. The security processor SP verifies a change part 8a of the firmware 8. The change part 8a of the firmware 8 may be referred to as a changed software element.

The monitoring unit 10 accesses a register 12 which is set by the security processor SP and controls execution of the firmware 8 by the processor P1 according to a verification result. The change part 8a of the firmware 8 includes, for example, instruction codes, data, or both of the instruction codes and the data.

In the present embodiment, the MMU 9 of each of the processors P1 to Pn manages loading and a change of the firmware 8 for the memory area E and write authority for the memory area E, and the MMU 9 performs control of access of the memory area E by each of the processors P1 to Pn.

In the present embodiment, the processor P1, the security processor SP, and the monitoring unit 10 in the processing device 1 operate in cooperation as follows, for example.

First, in the processing device 1, the firmware 8 stored in the memory area E is executed as in the following operations.

The processor P1 requests the security processor SP to permit the fetch from the memory area E in which the firmware 8 is disposed.

The security processor SP verifies the firmware 8 stored in the memory area E. When it is determined that the verification passes, the area information (for example, the start address 11a and the end address 11b) for specifying the memory area E and the fetch information lie specifying fetch permission are notified to the monitoring unit 10 via the register 12.

The monitoring unit 10 performs control to prohibit the fetch from the memory area E until the area information and the fetch information lie specifying fetch permission have been received from the security processor SP. When receiving the area information and the fetch information lie specifying the fetch permission, the monitoring unit 10 performs control to permit the fetch from the memory area E. Further, when the fetch from the memory area E is permitted, the monitoring unit 10 performs control to prohibit the write process or data transfer on or into the memory area E.

When receiving the area information specifying the memory area E and the fetch information 11e specifying fetch permission, from the security processor SP, the processor P1 starts to fetch the firmware 8.

At this point, it is assumed that the processor P1 requests the security processor SP to change the firmware 8.

The security processor SP notifies the monitoring unit 10 of change area information specifying a change area CE in the memory area E, a master device ID specifying a master device which is to be permitted to change the change area CE, and write information 13e specifying change permission for the change area CE illustrated in FIG. 4 (which is to be described below), via the register 12.

The monitoring unit 10 performs control to prohibit the write process or the data transfer on or into the change area CE until the change area information and the write information 13e specifying change permission have been received from the security processor SP. When receiving the change area information and the write information 13e specifying the change permission, the monitoring unit 10 performs control to permit the write process or the data transfer on or into the change area CE. Further, while the master device performs the write process or the data transfer on or into the change area CE, the monitoring unit 10 performs control to prohibit the fetch from the change area CE.

When receiving a notification indicating that the write process or the data transfer is permitted, from the security processor SP, the master device changes the change area CE.

The security processor SP verifies the change part 8a stored in the change area CE. When the change part 8a is verified, the security processor SP cancels the write process permission or the data transfer permission for the change area CE. When the permission for the write process or the data transfer is canceled, the security processor SP permits the processor P1 to fetch from the change area CE.

Figure 4:
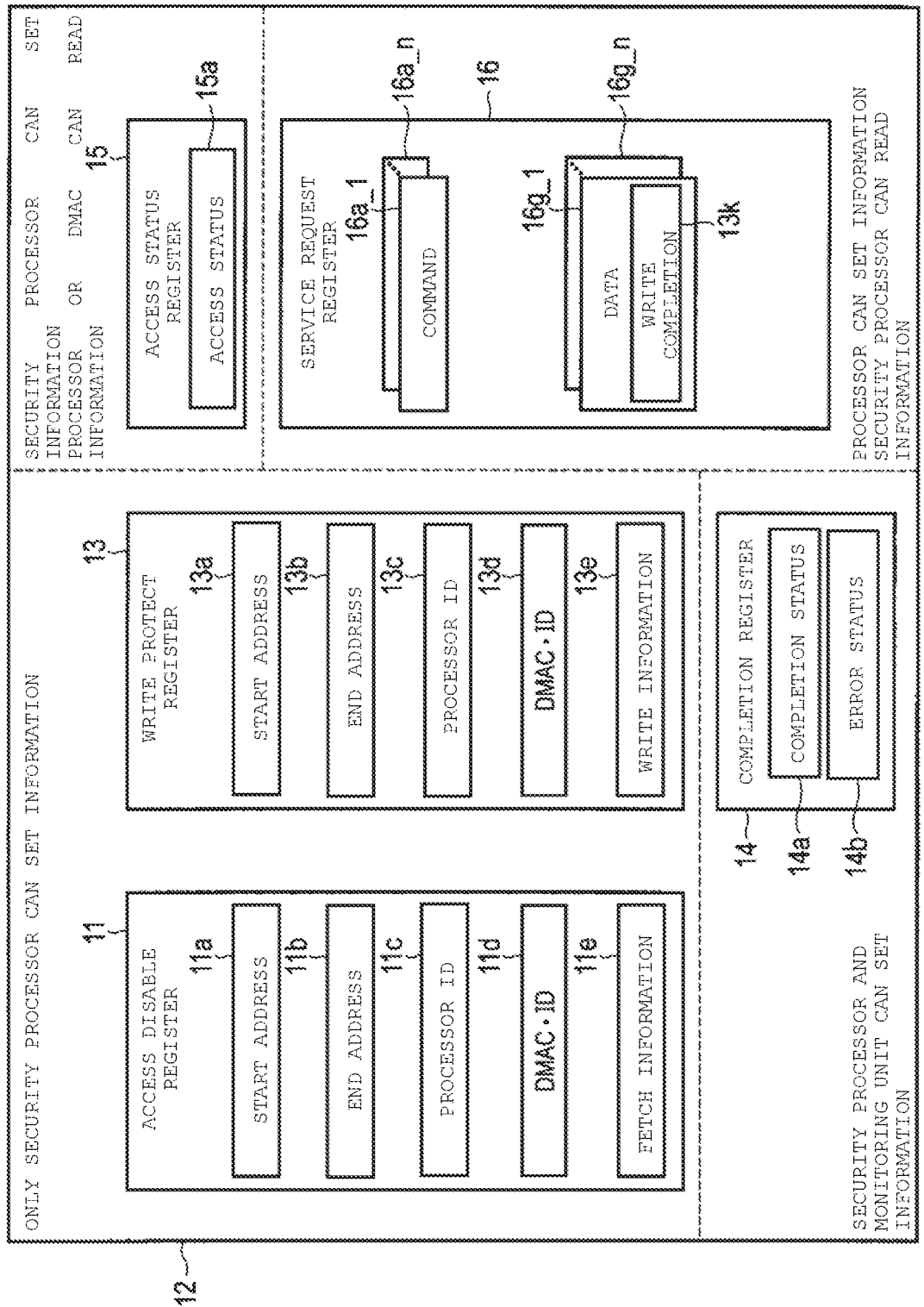
FIG. 4 is a block diagram illustrating an example of a configuration of a register that is set by the security processor and another processor.

FIG. 4 is a block diagram illustrating an example of a configuration of the register 12 that is in the memory controller 6 and set by the security processor SP and the processors P1 to Pn.

FIG. 4 mainly illustrates information corresponding to the specific memory area E to be verified in the memory 3. Information in the same manner as FIG. 4 is set for each of memory areas in the memory 3.

The register 12 includes the access disable register 11, a write protect register 13, a completion register 14, an access status register 15, and a service request register 16.

Only the security processor SP can set information in the access disable register 11 and the write protect register 13.

Only the security processor SP and the monitoring unit 10 can set information in the completion register 14.

The security processor SP can set information in the access status register 15 and each of the processors P1 to Pn and the DMAC 4 can read the information.

The processors P1 to Pn can set information in the service request register 16 and the security processor SP may read the information.

The write protect register 13 stores information that specifies write protection for the change area CE corresponding to the change part 8a of the firmware 8. The monitoring unit 10 controls whether to permit or prohibit the write process or the data transfer by a master device for the change area CE based on the information set in the write protect register 13.

The write protect register 13 stores a start address 13a and an end address 13b which represent an example of the change area information specifying the change area CE, a processor ID 13c that specifies the processor P1 which is permitted the write process on the change area CE, a DMAC ID 13d that specifies the DMAC 4 which is permitted to transfer data to the change area CE, and the write information 13e for specifying whether or not the write process on the change area CE is permitted. The write information 13e specifies the write process prohibition or data transfer prohibition as a default and when the security processor SP permits the write process or the data transfer, the write information 13e is changed from specifying prohibition for the write process or the data transfer to specifying permission for the write process or the data transfer. The processor ID 13c, the DMAC ID 13d, or both of the processor ID 13c and the DMAC ID 13d correspond to the master device ID.

When the write information 13e set in the write protect register 13 specifies permission for the write process or the data transfer, the processor P1 indicated by the corresponding processor ID 13c or the DMAC 4 indicated by the corresponding DMAC ID 13d may perform the write process or the data transfer on or into the change area CE. On the other hand, when the write information 13e set in the write protect register 13 specifies prohibition of the write process or the data transfer, the processor P1 indicated by the corresponding processor ID 13c or the DMAC 4 indicated by the corresponding DMAC ID 13d cannot perform the write process or the data transfer on or into the change area CE.

The completion register 14 stores a completion status 14a indicating whether or not the write process by the processor P1 specified by the processor ID 13c stored in the write protect register 13 is completed or whether or not the data transfer by the DMAC 4 specified by the DMAC ID 13d stored in the write protect register 13 is completed.

A setting of the completion status 14a for the completion register 14 will be described below in detail.

The monitoring unit 10 detects completion of the data transfer by the DMAC 4 based on a notification from the DMAC 4. When detecting that the data transfer is completed, the monitoring unit 10 stores the completion status 14a for indicating the completion of the data transfer in the completion register 14.

When the processor P1 completes the write process, the processor P1 stores write completion information 13k, which is a type of data 16g_1 described below and indicates the completion of the write process, in the service request register 16. The security processor SP detects the completion of the write process by reading the write completion information 13k for indicating the completion of the write process from the service request register 16 and stores the completion status 14a for indicating the completion of the write process in the completion register 14.

Therefore, in the present embodiment, components capable of setting information in the completion register 14 are only the monitoring unit 10 and the security processor SP.

The security processor SP can set information in the access status register 15 and each of the processors P1 to Pn and the DMAC 4 can read the information that is set in the access status register 15. The security processor SP stores an access status 15*a* for indicating whether or not the write process by the processor P1 or the data transfer by the DMAC 4 is permitted, in the access status register 15. As a result, it is possible to notify whether or not the write process or the data transfer is permitted, from the security processor SP to the processor P1 or the DMAC 4.

The service request register 16 stores commands 16*a*_1 to 16*a*_n and data 16*g*_1 to 16*g*_n that are to be notified from the processors P1 to Pn to the security processor SP. Specifically, each of the processors P1 to Pn stores the commands 16*a*_1 to 16*a*_n and the data 16*g*_1 to 16*g*_n in the service request register 16 as commands to be notified to the security processor SP and the security processor SP reads the commands 16*a*_1 to 16*a* n and the data 16*g*_1 to 16*g*_n from the service request register 16. As a result, it is possible to notify the commands 16*a*_1 to 16*a*_n and the data 16*g*_1 to 16*g*_n from each of the processors P1 to Pn to the security processor SP.

In the present embodiment, the change area CE (that is, an area between the start address 13*a* and the end address 13*b*) specified by the write protect register 13 corresponding to the specific processor P1 is provided in the memory area E (that is, an area between the start address 11*a* and the end address 11*b*) specified by the access disable register 11 corresponding to the specific processor P1.

When the monitoring unit 10 accesses the write protect register 13 and detects that the write process by the processor P1 or the data transfer by the DMAC 4 is not permitted, the monitoring unit 10 disables the write process or the data transfer and generates an interrupt to notify a security error for the security processor SP.

As described above, in the present embodiment, the monitoring unit 10 monitors the data transfer by the DMAC 4. When the DMAC 4, specified by the DMAC ID 13*d* set in the write protect register 13, completes the data transfer to the change area CE, the monitoring unit 10 sets the completion status 14*a* for indicating the completion of the data transfer to the completion register 14. By accessing the completion register 14, the security processor SP may determine whether the data transfer to the change area CE is completed.

On the other hand, the monitoring unit 10 cannot detect that the write process on the change area CE by the processor P1 specified by the processor ID 13*c* is completed. In the present embodiment, when the processor P1 completes the write process on the change area CE, the processor P1 stores the write completion information 13*k* for indicating the completion of the write process, in the service request register 16. The security processor SP may determine whether the write process on the change area CE by the processor P1 is completed by reading the write completion information 13*k* for indicating the completion of the write process from the service request register 16.

When the master device specified by the processor ID 13*c* or the DMAC ID 13*d* executes the write process or the data transfer to the change area CE between the start address 13*a* and the end address 13*b* that are specified in the write protect register 13 in a state in which the completion status 14*a* is stored in the completion register 14, the monitoring unit 10 detects the write process or the data transfer as an error and notifies the security processor SP of the error. As a result, it is possible to exclude a possibility that the change area CE is tampered with while the security processor SP performs the verification. For example, the monitoring unit 10 may notify the security processor SP of the error by generating an interrupt for the security processor SP. Further, the monitoring unit 10 may store an error status 14*b* for indicating that the error is detected, in the completion register 14.

To enable the processor P1 to execute all of the instruction codes of the firmware 8, the security processor SP is required to set the area information for appropriately specifying the memory area E (that is, the start address 11*a* and the end address 11*b*), set the processor ID 11*c*, set the DMAC ID 11*d*, and set the fetch information lie for specifying fetch permission, in the access disable register 11.

Further, to enable the processor P1 to execute all of the instruction codes of the firmware 8, the security processor SP is required to set the change area information for appropriately specifying the change area CE (that is, the start address 13*a* and the end address 13*b*), set the processor ID 13*c* or the DMAC ID 13*d*, and set the write information 13*e* for specifying that the write process or the data transfer on or into the change area CE is prohibited, in the write protect register 13.

When the write information 13*e* of the write protect register 13 specifies write prohibition, the processor P1 specified by the corresponding processor ID 13*c* or the DMAC 4 specified by the corresponding DMAC ID 13*d* does not execute the write process or the data transfer to the change area CE, and the processor P1 may fetch the change part 8*a* from the change area CE of the memory 3.

It is noted that when the write information 13*e* indicates the write prohibition, setting the start address 13*a*, the end address 13*b*, the processor ID 13*c*, and the DMAC ID 13*d* may be omitted.

When changing some pieces of the firmware 8, the processor P1 requests the change area information specifying the change area CE of the memory 3 and the master device ID that specifies the processor P1 performing the write process, the DMAC 4 performing the data transfer, or the like, to the security processor SP by communication between the processors. In the example of the present embodiment, a service request register 16 is used for transferring information from the processor P1 to the security processor SP.

The security processor SP sets notified contents in the write protect register 13 and sets the write information 13*e* for specifying that the write process or the data transfer is permitted, in the write protect register 13.

The security processor SP sets the access status 15*a* specifying that the write process or the data transfer is permitted, to the access status register 15. The processor P1 or the DMAC 4 accesses the access status register 15 and obtains the access status 15*a* specifying that the write process or the data transfer is permitted. As a result, the permission for the write process or the data transfer is notified from the security processor SP to the processor P1 or the DMAC 4.

When the access status 15*a* of the access status register 15 specifies that the write process or the data transfer is permitted, the processor P1 specified by the processor ID 13*c* or the DMAC 4 specified by the DMAC ID 13*d* of the write protect register 13 performs the write process or the data transfer on or into the change area CE requested by the processor P1 to the security processor SP. At this time, the monitoring unit 10 permits the write process or the data transfer to the change area CE specified by the change area information set in the write protect register 13 and appropriately delays the processor P1 performing the fetch from the change area CE specified by the change area information that is set in the write protect register 13. The delay state of the fetch is released after the security processor SP detects that the write process or the data transfer is completed by the completion status 14a of the completion register 14, verifies the change part 8a of the change area CE specified by the change area information of the write protect register 13, checks that the change part 8a stored in the change area CE is authentic, and resets the write information 13e to specify that the write process or the data transfer is prohibited in the write protect register 13.

In this way, in the present embodiment, if the write information 13e corresponding to the change area CE specified by the change area information that is set in the write protect register 13 is once at a state in which the write process or the data transfer is permitted, the fetch from the change area CE, in which the write process or the data transfer is permitted, is prohibited. The fetch prohibition state, in which the fetch from the change area CE specified by the change area information that is set in the write protect register 13, is continued until the write information 13e corresponding to the change area CE, which is specified by the change area information that is set in the write protect register 13 by the security processor SP, is changed to be in a state in which the write process or the data transfer is prohibited.

When detecting the completion of the write process or the data transfer by the completion status 14a of the completion register 14, the security processor SP verifies the transferred change part 8a.

During the verification, in order to prohibit the further write process by the processor P1 specified by the processor ID 13c and the further data transfer by the DMAC 4 specified by the DMAC ID 13d, both of which are set in the write protect register 13, and to prohibit the fetch by the processors P1 to Pn from the change area CE specified by the change area information that is set in the write protect register 13, the security processor SP sets the write information 13e to specify that the write process and the data transfer are prohibited in the write protect register 13.

In addition to the instruction codes and the data, it is assumed that third authentication information (e.g., digital signature) for the instruction codes and the data is stored as the change part 8a in the change area CE of the memory 3. The security processor SP generates, for example, fourth authentication information by encrypting the instruction codes and the data of the change part 8a with the public key owned by the security processor SP and compares the third authentication information with the fourth authentication information so as to verify the change part 8a.

As described above, when the processor P1 specified by the processor ID 13c or the DMAC 4 specified by the DMAC ID 13d executes the write process or the data transfer to the change area CE between the start address 13a and the end address 13b in a state in which the completion status 14a is stored in the completion register 14, the monitoring unit 10 detects an error. When detecting the error, the monitoring unit 10 stores the error status 14b indicating the error in the completion register 14 and notifies the security processor SP of the error via the completion register 14. As a result, it is possible to prevent the change area CE from being tampered with while the security processor SP performs the verification.

Figure 5:
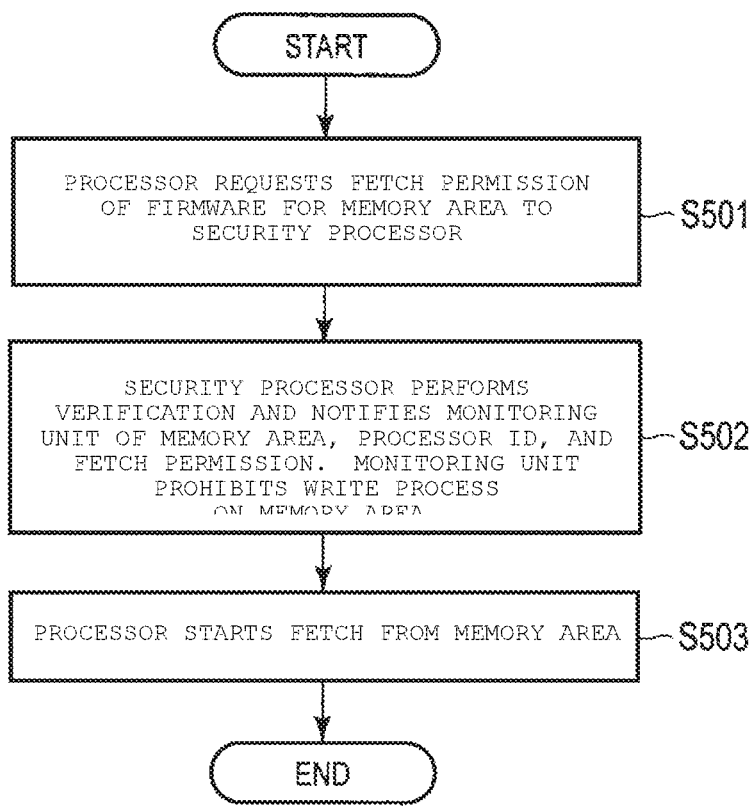
FIG. 5 is a flowchart illustrating an example of a fetch process on firmware in the processing device according to the second embodiment.

FIG. 5 is a flowchart illustrating an example of a fetch process on the firmware 8 in the processing device 1 according to the present embodiment.

Figure 6:
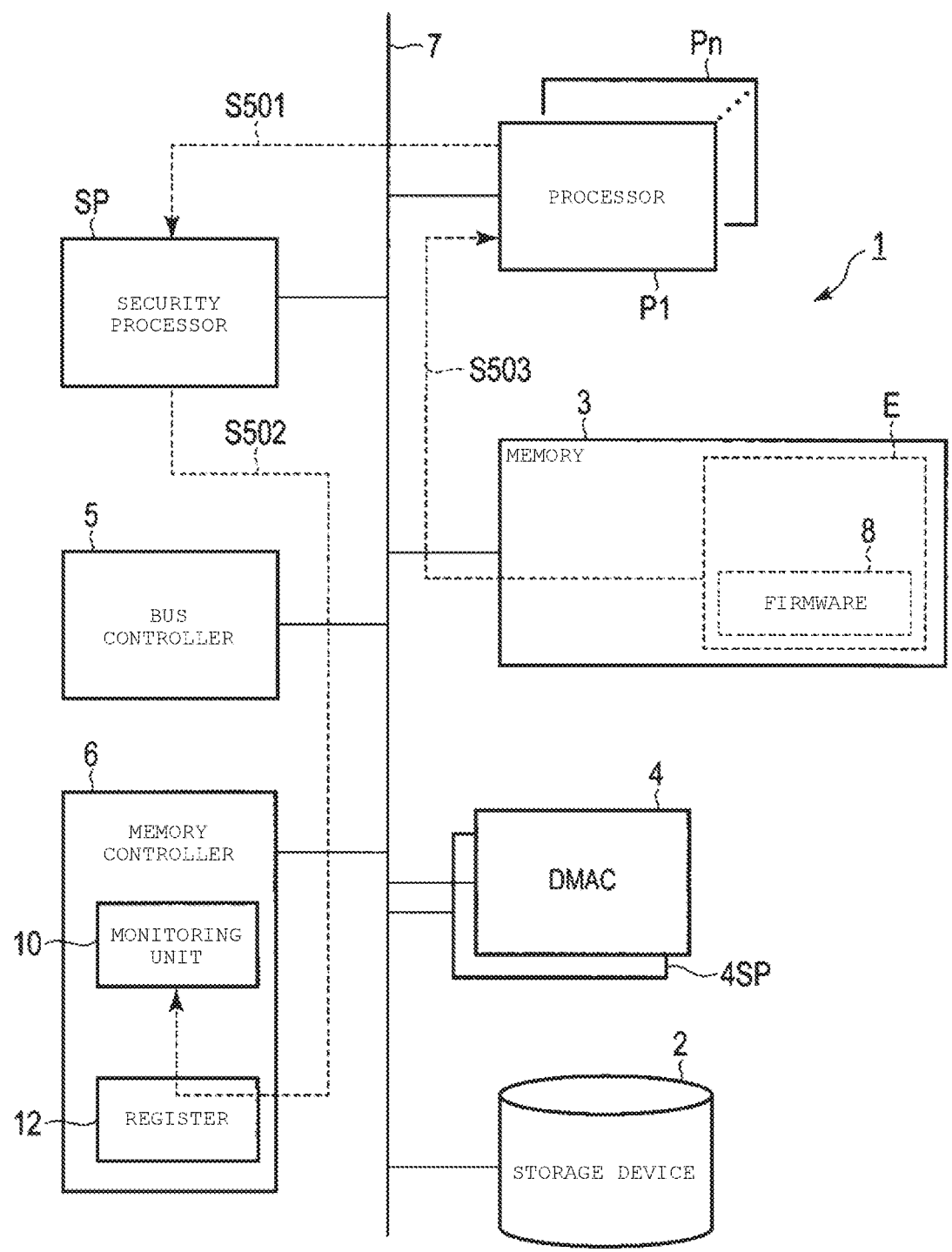
FIG. 6 is a block diagram illustrating an example of cooperation between components of the processing device in which the fetch process is executed.

FIG. 6 is a block diagram illustrating an example of cooperation between components of the processing device 1 in which the fetch process is executed.

In step S501, the processor P1 requests fetch permission for the memory area E of the memory 3 to the security processor SP. The firmware 8 is stored in the memory area E. The request for the fetch permission from the processor P1 to the security processor SP may be performed, for example, by the processor P1 setting the command 16a_1 in the service request register 16 illustrated in FIG. 4 described above and by the security processor SP reading the command 16a_1 from the service request register 16.

In step S502, the security processor SP verifies the firmware 8 stored in the memory area E. When it is determined that the verification passes, the start address 11a and the end address 11b specifying the memory area E, the processor ID 11c specifying the processor P1, and the fetch information 11e specifying fetch permission are stored in the access disable register 11. The monitoring unit 10 accesses the start address 11a, the end address 11b, the processor ID 11c, and the fetch information lie stored in the access disable register 11. As a result, the area information and fetch permission for the memory area E by the processor P1 are notified from the security processor SP to the monitoring unit 10.

The monitoring unit 10 controls the fetch from the memory area E to be in a wait state until the security processor SP notifies the monitoring unit 10 of the fetch permission.

Further, along with the fetch permission, the monitoring unit 10 prohibits the write process on the memory area E.

In step S503, the processor P1 starts the fetch from the memory area E according to the notification of the fetch permission from the security processor SP and fetch permission control from the monitoring unit 10.

Figure 7:
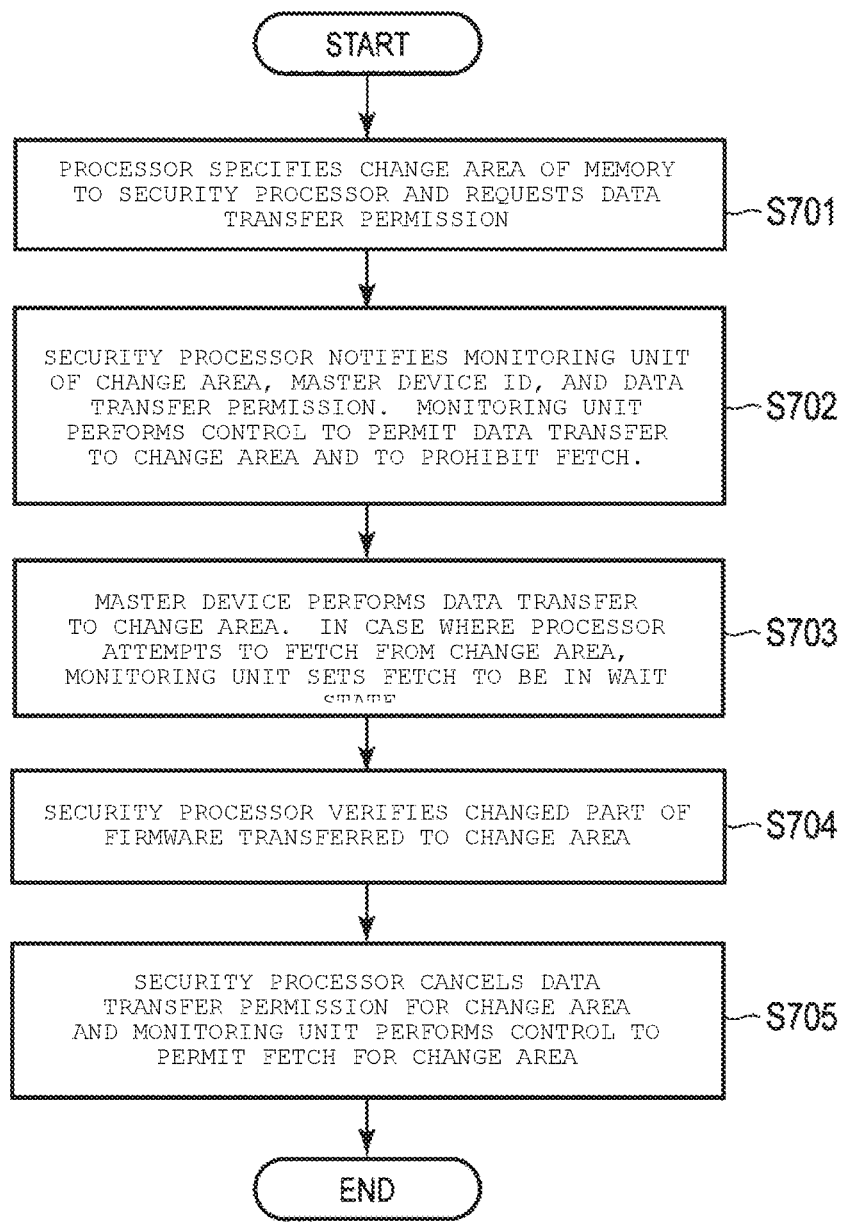
FIG. 7 is a flowchart illustrating an example of a partial change of the firmware in the processing device according to the second embodiment.

FIG. 7 is a flowchart illustrating an example of a partial change of the firmware 8 in the processing device 1 according to the present embodiment. With the processes of FIG. 7, for example, some pieces of the firmware 8 are newly loaded in the firmware 8 and some functions are replaced with other functions.

Figure 8:
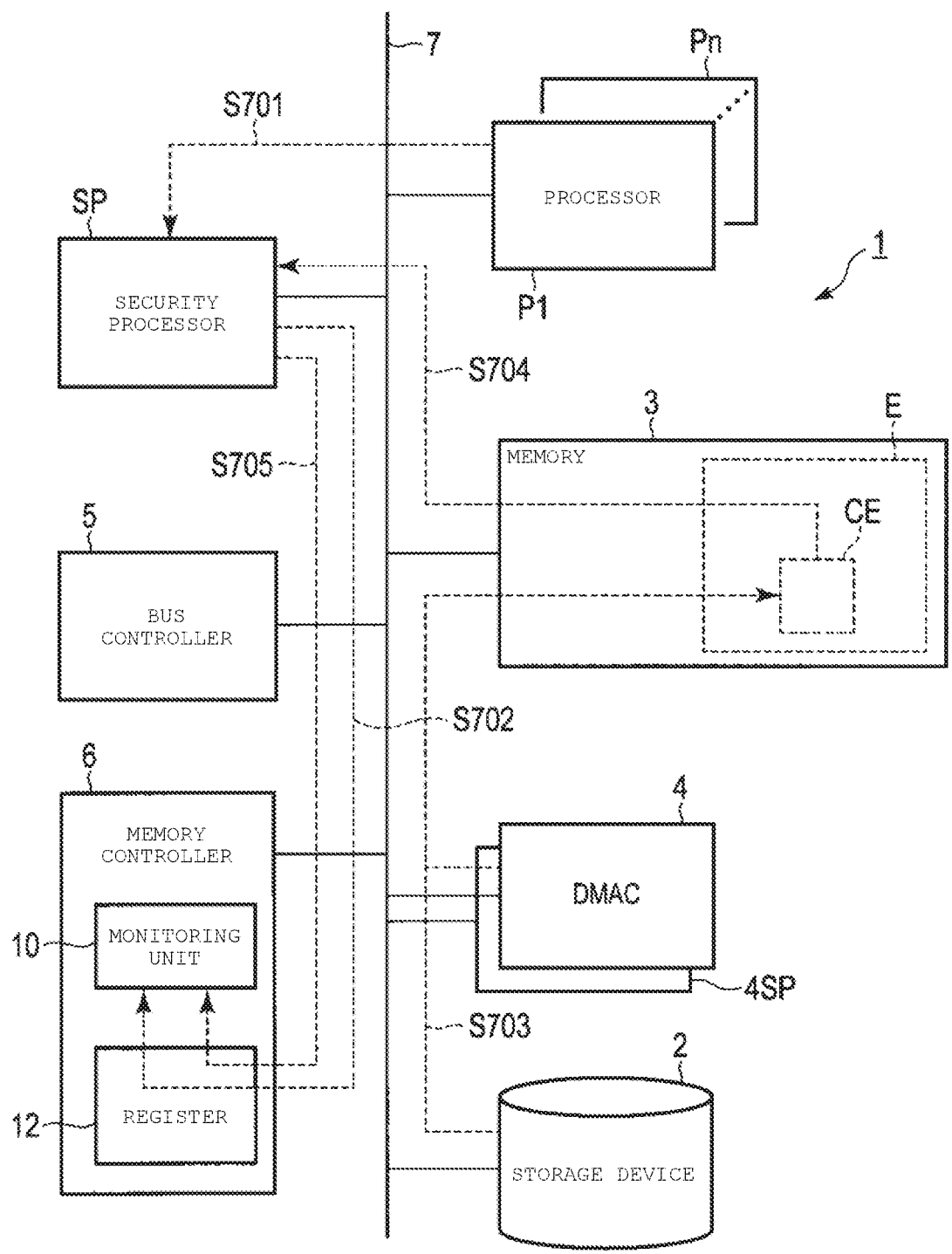
FIG. 8 is a block diagram illustrating an example of cooperation between components of the processing device in which the firmware is partially changed.

FIG. 8 is a block diagram illustrating an example of cooperation between components of the processing device 1 in which the firmware 8 is partially changed.

In FIGS. 7 and 8, a case where the data transfer is executed in the change area CE will be described as an example, but the write process may be performed on the change area CE in the same manner.

In step S701, the processor P1 specifies the change area CE of the memory 3 and requests data transfer permission to the security processor SP. The notification of the request for the data transfer permission from the processor P1 to the security processor SP may be performed, for example, by the processor P1 setting the command in the service request register 16 illustrated in FIG. 4 described above and by the security processor SP reading the command from the service request register 16.

In step S702, the security processor SP stores the start address 13a and the end address 13b specifying the change area CE in the memory area E in which the change is permitted, the master device ID specifying the master device capable of performing the data transfer to the change area CE, and the write information 13e specifying data transfer permission to the change area CE, in the write protect register 13. In the present embodiment, the memory area E, which is specified by the start address 11*a* and the end address 11*b* that are set in the access disable register 11, needs to include the change area CE specified by the start address 13*a* and the end address 13*b* in the write protect register 13. When the memory area E, which is specified by the start address 11*a* and the end address 11*b* that are set in the access disable register 11, does not include the change area CE specified by the start address 13*a* and the end address 13*b* that are set in the write protect register 13, the monitoring unit 10 notifies the security processor SP of an error via the completion register 14.

The monitoring unit 10 accesses the start address 13*a*, the end address 13*b*, the master device ID, and the write information 13*e* stored in the write protect register 13. As a result, the monitoring unit 10 performs control to permit the data transfer to the change area CE by the processor P1. Along with data transfer permission, the security processor SP stores the access status 15*a* specifying the data transfer permission in the access status register 15. The processor P1 reads the access status 15*a* from the access status register 15. As a result, it is possible to notify that the data transfer is permitted, from the security processor SP to the processor P1.

Further, along with the data transfer permission, the monitoring unit 10 performs control to prohibit the fetch from the change area CE corresponding to the start address 13*a* and the end address 13*b*.

In step S703, the master device capable of performing the write process on the change area CE executes the data transfer of the change part 8*a* from the storage device 2 to the change area CE. When the processor P1 attempts to fetch from the change area CE during the data transfer to the change area CE, the monitoring unit 10 sets the attempted fetch by the processor P1 to be in a wait state.

The monitoring unit 10 detects completion of the data transfer by a state received from the DMAC 4. When the data transfer is completed, the monitoring unit 10 stores the completion status 14*a* for indicating the completion of the data transfer in the service request register 16.

It is noted that in a case of not the data transfer but the write process, when the processor P1 completes the write process, the processor P1 stores the write completion information 13*k* in the service request register 16. The security processor SP reads the write completion information 13*k* from the service request register 16. When the write process is completed, the security processor SP stores the completion status 14*a* for indicating the completion of the write process in the completion register 14.

When the data transfer of the change part 8*a* to the change area CE is completed, in step S704, the security processor SP verifies the change part 8*a* of the firmware 8 that is transferred to the change area CE is performed.

In step S705, when the change part 8*a* of the firmware 8 is authentic, the security processor SP cancels the permission for the write process and the data transfer for the change area CE and prohibits the write process and the data transfer for the change area CE by setting the write information 13*e* in the write protect register 13 to prohibit the write process and the data transfer. The monitoring unit 10 performs control to permit the fetch from the change area CE.

In the present embodiment described above, the security processor SP specifies for the monitoring unit 10 a change area CE on which a write process or a data transfer can be performed and the master device which can perform the write process or the data transfer. By the write process or the data transfer, some pieces of the firmware 8 stored in the change area CE are changed. The monitoring unit 10 executes access control for the change area CE specified by the security processor SP. As a result, the security processor SP can control the change of some pieces of the firmware 8 corresponding to the change area CE and prevents an unauthorized write process or an unauthorized data transfer by using the monitoring unit 10.

In the present embodiment, the security processor SP can control the fetch and the change of the firmware 8 by the processors P1 to Pn without redesigning the processors P1 to Pn implemented in the processing device 1.

In the present embodiment, when the firmware 8 is changed, it is possible to verify integrity of the change part 8*a* of the firmware 8, to detect tampering of the firmware 8, and thus prevent the firmware 8 from being tampered with.

During the integrity verification, the fetch of the change part 8*a* by the processors P1 to Pn is delayed. As a result, it is possible to prevent the processors P1 to Pn from executing the change part 8*a* when the change part 8*a* cannot be verified.

It is noted that in the present embodiment, as an integrity verification result by the security processor SP, when it is determined that the write process or the data transfer for the change area CE in the memory 3 fails verification, the security processor SP determines that an unauthorized access is attempted on the processing device 1 and stops the process of the processing device 1, so that the security processor SP may protect the processing device 1.

In the present embodiment, the master device that has write authority to the change area CE is set in the register 12. As a result, it is possible to prevent the write process or the data transfer from being executed by the master device not having the write authority to the change area CE.

In the present embodiment, even if the write process or the data transfer to the change area CE in the memory 3 is a regular procedure, when an abnormality such as a digital signature verification failure is detected in the change part 8*a* of the change area CE, it is possible to prohibit the fetch of the change part 8*a* in which the abnormality is detected.

In the first and second embodiments, in order to delay the non-permitted fetch, the bus controller 5 and the memory controller 6 may include a plurality of ports and may include a mechanism that sets the fetch of a monitoring target in a wait state by using some of these ports so as not to disturb traffic on the bus 7.

Third Embodiment

In the present embodiment, a specific example of a setting for the various registers described in the first and second embodiments will be described.

Figure 9:
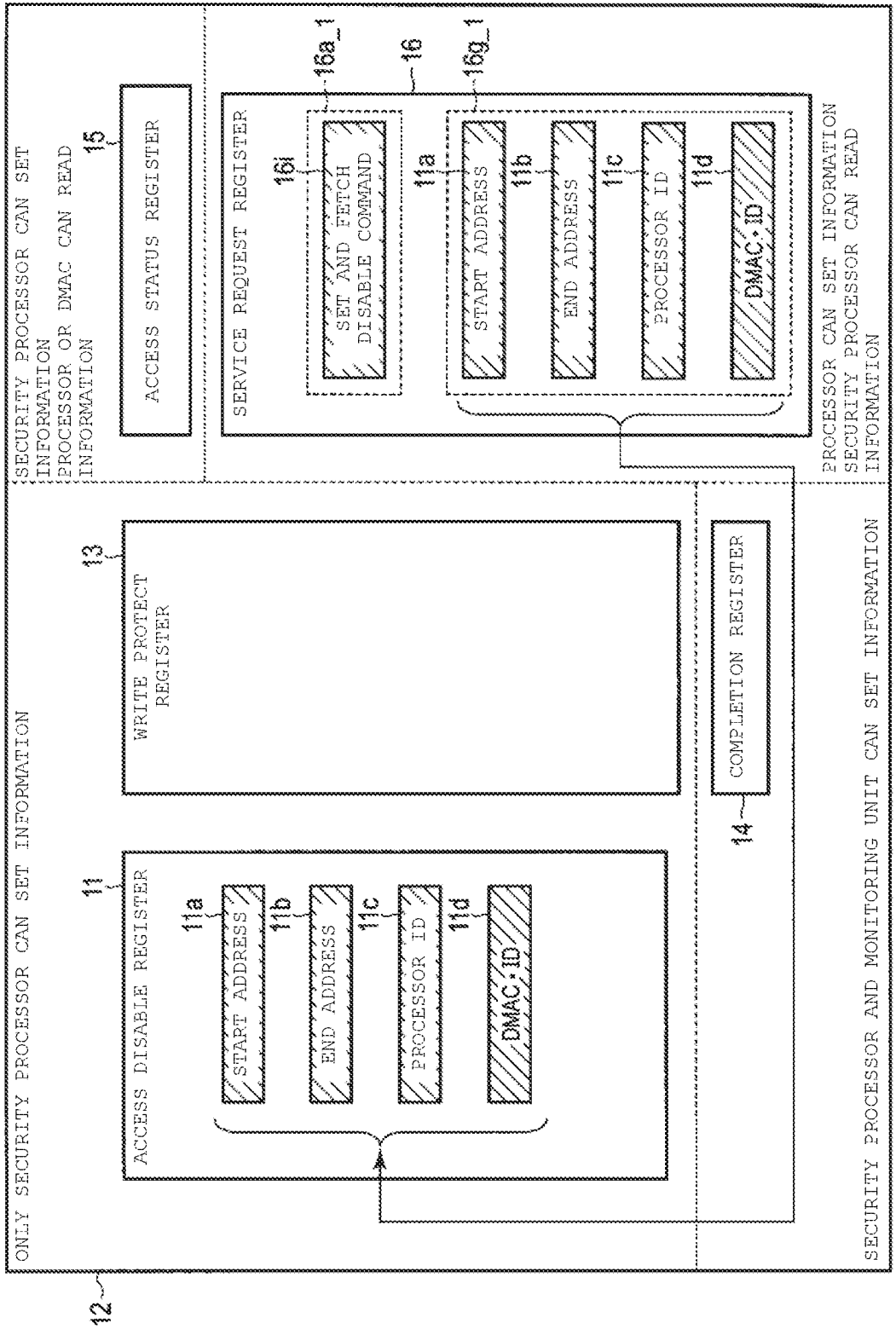
FIG. 9 is a block diagram illustrating an example of a setting of the access disable register.

FIG. 9 is a block diagram illustrating an example of a setting of the access disable register 11.

The processor P1 stores a set and fetch disable command 16*i*, the start address 11*a*, the end address 11*b*, the processor ID 11*c*, and the DMAC ID 11*d* in the service request register 16.

The set and fetch disable command 16*i* is an example of the command 16*a*_1 in FIG. 4 described above.

The start address 11*a*, the end address 11*b*, the processor ID 11*c*, and the DMAC ID 11*d* are examples of information included in the data 16*g*_1 in FIG. 4 described above.

The set and fetch disable command 16*i* is a command for causing the security processor SP to set the start address 11*a*, the end address 11*b*, the processor ID 11*c*, and the DMAC ID 11*d* for the access disable register 11.

The security processor SP accesses the service request register 16. The security processor SP stores the start address 11a, the end address 11b, the processor ID 11c, and the DMAC ID 11d stored in the service request register 16, into the access disable register 11 based on the set and fetch disable command 16i.

Figure 10:
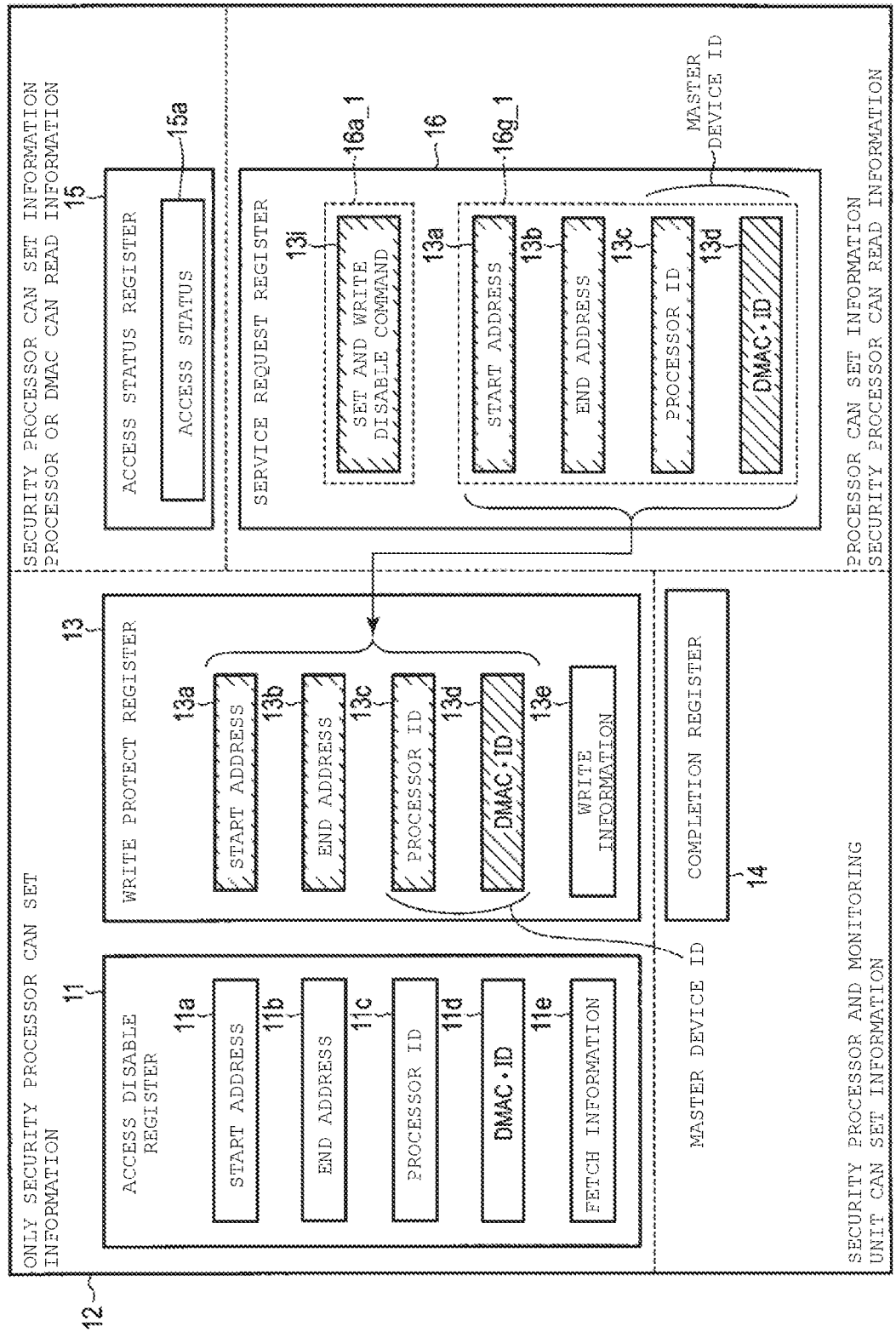
FIG. 10 is a block diagram illustrating an example of a setting of a write protect register.

FIG. 10 is a block diagram illustrating an example of a setting of the write protect register 13.

The processor P1 stores a set and write disable command 13i, the start address 13a, the end address 13b, and the master device ID corresponding to the processor ID 13c and/or the DMAC ID 13d in the service request register 16.

The set and write disable command 13i is an example of the command 16a_1 in FIG. 4 described above.

The start address 13a, the end address 13b, and the processor ID 13c and/or the DMAC ID 13d are examples of information included in the data 16g_1 in FIG. 4 described above.

The set and write disable command 13i is a command for causing the security processor SP to set the start address 13a, the end address 13b, and the processor ID 13c and/or the DMAC ID 13d for the write protect register 13.

The security processor SP accesses the service request register 16. The security processor SP stores the start address 13a, the end address 13b, and the processor ID 13c and/or the DMAC ID 13d stored in the service request register 16, into the write protect register 13 based on the set and write disable command 13i.

Figure 11:
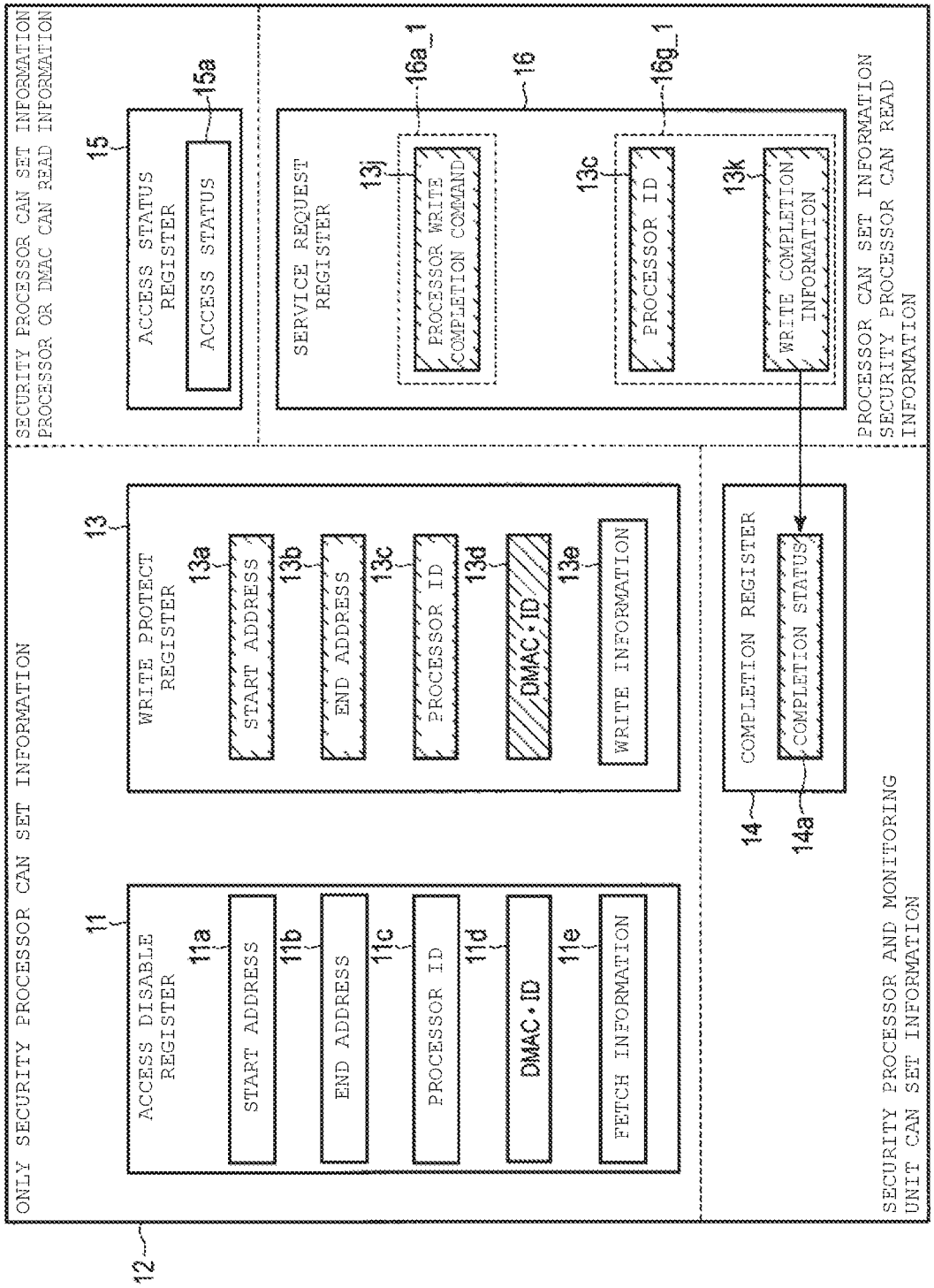
FIG. 11 is a block diagram illustrating an example of a setting of a completion register.

FIG. 11 is a block diagram illustrating an example of a setting of the completion register 14. FIG. 11 illustrates a setting of data for notifying the security processor SP of completion of the write processing by the processor P1.

When the write process is completed, the processor P1 stores a processor write completion command 13j, the processor ID 13c specifying the processor P1, and the write completion information 13k for indicating a state in which the write process is completed, into the service request register 16.

The processor write completion command 13j is a command for notifying the security processor SP that the write is completed by the processor P1. The processor write completion command 13j is an example of the command 16a_1 in FIG. 4 described above.

The processor ID 13c and the write completion information 13k are examples of information included in the data 16g_1 in FIG. 4 described above.

The security processor SP reads the processor write completion command 13j, the processor ID 13c, and the write completion information 13k from the service request register 16 and stores the completion status 14a into the completion register 14.

It is noted that when the security processor SP is notified that the data transfer by the DMAC 4 is completed, the monitoring unit 10 detects the completion of the data transfer by the DMAC 4 and stores the completion status 14a for indicating the completion of the data transfer into the completion register 14.

By accessing the completion register 14 stored in the completion status 14a, the security processor SP may recognize the completion of the write process by the processor P1.

As described above, in the present embodiment, the register 12 includes the access disable register 11 and the write protect register 13 in which only the security processor SP can set information and the other devices cannot set information, the completion register 14 in which the security processor SP and the monitoring unit 10 can set information, the access status register 15 used for notifying information from the security processor SP to the processors P1 to Pn, and the service request register 16 used for notifying information from the processors P1 to Pn to the security processor SP.

The processor P1 stores a command 16a and necessary data 16g in the service request register 16. The security processor SP reads the command 16a and the data 16g from the service request register 16 and sets information in the access disable register 11 and the write protect register 13 or the completion register 14.

As a result, the processors P1 to Pn can notify the security processor SP of the necessary commands 16a_1 to 16_n and the data 16g_1 to 16_n. Further, the security processor SP can set the necessary data 16g_1 to 16_n in a register which only the security processor SP can set based on the commands 16a_1 to 16_n from the processors P1 to Pn. The monitoring unit 10 can control the writing, the data transfer, and the fetch based on information in the register 12 set by the security processor SP. In this way, by limiting information setting authority for the access disable register 11 and the write protect register 13 to the security processor SP, it is possible to improve integrity of the firmware 8.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A processing device comprising:
   a memory;
   a first processor configured to execute software fetched from a memory area of the memory;
   a second processor configured to perform a verification of integrity of the software stored in the memory area of the memory; and
   a controller configured to control an access to the memory and a fetch of the software from the memory area of the memory by the first processor according to the verification of integrity performed by the second processor, wherein
   the controller is further configured to:
      prohibit the fetch by the first processor until the verification of integrity of the software performed by the second processor is successful;
      permit the fetch by the first processor when the verification of integrity of the software performed by the second processor is successful; and
      while the fetch from the memory area is permitted, prohibit a write access to the memory area by a master device.

2. The processing device according to claim 1, wherein a notification of successful verification of integrity of the software specifies an area of the memory in which the software is stored and a permission for the fetch by the first processor from the memory area.

3. The processing device according to claim 2, wherein the notification is stored in a register that can be set by the second processor but cannot be set by the controller and the first processor, and is readable by the controller.

4. The processing device according to claim 1, wherein in response to a request by the first processor to change the software, the second processor notifies the controller of a change area in the memory area, a device ID specifying a device which is permitted to store changes in the change area, and a change permission setting indicating that a change of the change area is permitted, and the controller performs control to permit or prohibit the write process on the change area according to the notification from the second processor of the change area, the device ID, and the change permission setting.

5. The processing device according to claim 4, wherein the controller performs control to prohibit a fetch from the change area while permitting the write process on the change area.

6. The processing device according to claim 4, wherein the second processor verifies a changed software element stored in the change area and, upon verifying the changed software element, the second processor cancels the change permission setting so that the write process on the change area is no longer permitted.

7. The processing device according to claim 6, wherein upon cancelling the change permission setting, the second processor permits the fetch from the change area.

8. A processing device comprising:
a security processor;
a general processor;
a memory that stores first firmware for the security processor and second firmware for the general processor, the first firmware and the second firmware to be loaded at the time of starting up the processing device; and
a controller configured to control a fetch of the second firmware by the general processor according to a verification of the second firmware by the security processor, wherein
the security processor is configured to verify the first firmware by verifying a first digital signature of the first firmware and the second firmware by verifying a second digital signature of the second firmware, and
the security processor is further configured to notify the controller of a successful verification of the second firmware by setting an access control register with first values specifying a memory area within the memory in which the verified second firmware is stored, a second value specifying an ID of the general processor, and a third value specifying that fetching from the memory area is permitted.

9. The processing device according to claim 8, wherein the access control register can be set by the security processor but cannot be set by the controller and the general processor, and is readable by the controller.

10. The processing device according to claim 8,
wherein the controller prohibits a write process on the memory area while the fetch from the memory area is permitted.

11. The processing device according to claim 8, further comprising:
a service request register in which the general processor sets a request to change the second firmware, and
in response to the request set in the service request register by the general processor, the security processor notifies the controller of a change area in the memory area, a device ID specifying a device which is permitted to store changes in the change area, and a change permission setting indicating that a change of the change area is permitted.

12. The processing device according to claim 11, wherein the controller performs control to permit or prohibit a write process on the change area according to the notification from the security processor of the change area, the device ID, and the change permission setting.

13. The processing device according to claim 12, wherein the controller performs control to prohibit a fetch from the change area while permitting the write process on the change area.

14. The processing device according to claim 12, wherein the security processor verifies a changed software element stored in the change area and, upon verifying the changed software element, the security processor cancels the change permission setting so that the write process on the change area is no longer permitted.

15. The processing device according to claim 14, wherein upon cancelling the change permission setting, the security processor permits the fetch from the change area.

16. A method of securely executing firmware in a processing device having a security processor, a general processor, and a memory in which first firmware for the general processor is to be stored, said method comprising:
loading the first firmware into the memory at the time of starting up the processing device;
verifying a digital signature of the first firmware using the security processor to verify the first firmware;
by using the security processor, setting an access control register with first values specifying a memory area within the memory in which the verified first firmware is stored, a second value specifying an ID of the general processor, and a third value specifying that fetching from the memory area is permitted;
in response to the setting of the access control register with the first values, the second value, and the third value, generating an interrupt for the general processor; and
in response to the interrupt, fetching the first firmware by using the general processor.

17. The method according to claim 16, wherein the processing device further comprises a controller that is able to read from the access control register but is not able to set the access control register, and the controller generates the interrupt in response to the setting of the access control register with the first values, the second value, and the third value.

18. The method according to claim 17, further comprising:
prohibiting a write process on the memory area while the fetching from the memory area is permitted.

19. The method according to claim 16, further comprising:
setting a service request register to request a change to the first firmware, and
in response to the request set in the service request register, setting a write protect register with fourth values specifying a change area in the memory area, a fifth value specifying a device which is permitted to store changes in the change area, and a sixth value specifying that storing changes in the change area is permitted.

20. The processing device according to claim 1, wherein the master device includes a direct memory access controller (DMAC) configured to perform a write access to the memory area.

* * * * *